United States Patent

[11] 3,592,555

| [72] | Inventor | Bruce A. Mackey, Sr. |
| --- | --- | --- |
| | | Mundelein, Ill. |
| [21] | Appl. No. | 821,199 |
| [22] | Filed | May 2, 1969 |
| [45] | Patented | July 13, 1971 |
| [73] | Assignee | Radial Lip Machine Corporation |

[54] DRILL WITH DISCONTINUOUS CUTTING LIPS
4 Claims, 7 Drawing Figs.

[52] U.S. Cl. ......................................... 408/225
[51] Int. Cl. .......................................... B23b 51/02
[50] Field of Search ............................. 77/65, 66, 67, 68, 70

[56] References Cited
UNITED STATES PATENTS

| 2,332,295 | 10/1943 | Bouchal | 77/70 X |
| --- | --- | --- | --- |
| 2,193,186 | 3/1940 | Bannister | 77/70 |

*Primary Examiner*—Francis S. Husar
*Attorney*—Molinare, Allegretti, Newitt and Witcoff ABSTRACT: A drill having discontinuous cutting lips defined by a characterized recess formed in each cutting lip adjacent the tip of the drill to provide for longer drill life with improved drilling characteristics in both hard and soft materials.

PATENTED JUL 13 1971
3,592,555
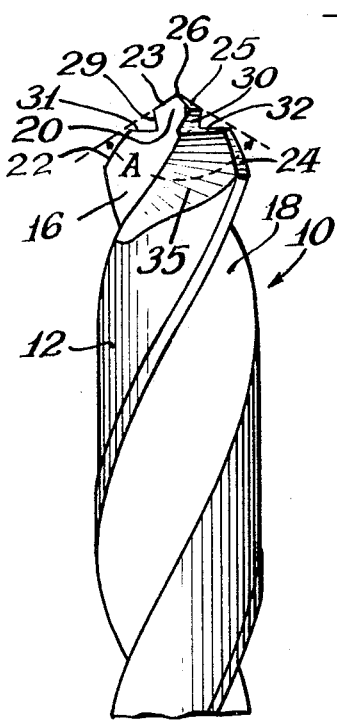
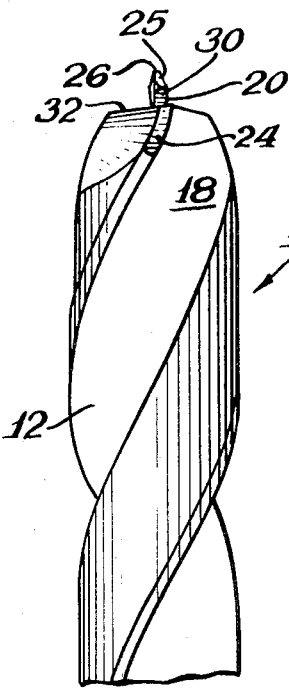
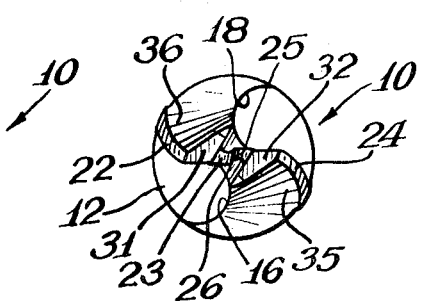
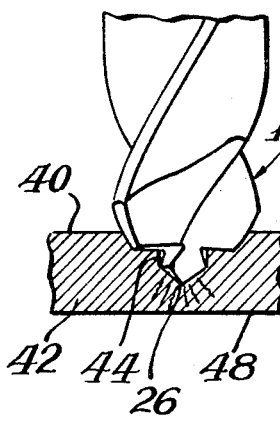
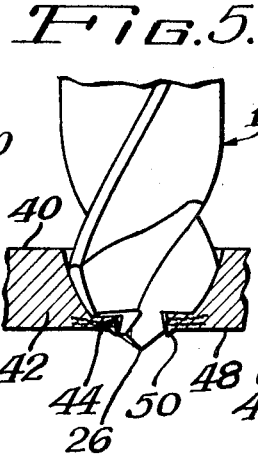
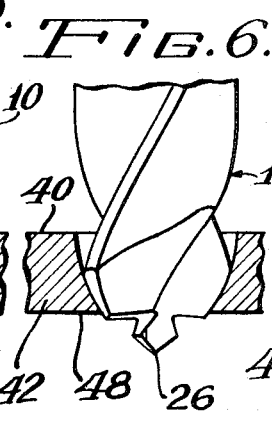
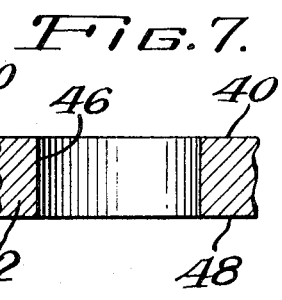
Inventor:
Bruce A. Mackey, Sr.
By Bair, Freeman & Molinare
Attys.

DRILL WITH DISCONTINUOUS CUTTING LIPS

BACKGROUND OF THE INVENTION

This invention relates to drills and, more particularly, to a drill having a characterized recess formed in each cutting lip for increasing drill life for drilling in harder materials, and while at the same time forming smoother walled and more accurate holes in a wide range of materials.

The conventional commercial twist drill is considered to be a roughing tool which requires a subsequent reaming or boring of the hole to provide a finished hole. Such drill is generally ground to a substantially conical point, with the included angle varying for different types of materials. Reference may be made to trade manuals, for example, Tool & Engineer's Handbook, ASTME, for specific included angles for different materials. Generally, for harder materials, the included angle will be greater than for softer materials.

Accurate drilling of a proper hole in a workpiece is known to present a number of problems. The center of the hole must be located in the correct position and the axis of the hole must be a straight line. Additionally, the axis of the hole must run in a proper direction so that the end as well as the beginning of the hole shall be in the proper location. It is desired that the hole be round, that it be of uniform cross section from top to bottom with no bell mounting, and that the hole be of the desired size.

Furthermore, it is desired that the above-noted requirements be met for a variety of materials, including relatively soft metals and relatively hard metals such as stainless steel or forgings. For softer materials, the drill point may wander and cause undesirable oversize drilling of the hole or out-of-round conditions. In very hard materials, drill points have sometimes disintegrated when use is attempted. Another desiderata of a drill is that its life be lengthened, particularly where the drill is used in relatively hard materials.

The conventional drills having a conical point generally do not provide the accurate drilling required for a wide variety of materials and because of the rather sharp corners where the drill point meets the periphery of the drill, the drilled hole is generally rough and a subsequent reaming or bore smoothing operation is needed.

An object of this invention is to provide a drill which will overcome the disadvantages and deficiencies of prior commercial drills.

Another object of this invention is to provide a drill capable of drilling very accurate, smooth-walled holes that require no further reaming or wall smoothing operations in relatively soft, as well as in relatively hard materials.

Yet another object of this invention is to provide a drill having a discontinuous cutting lip with a centering point capable of drilling substantially uniform holes in a wide range of materials, such holes being round in cross section and uniform in cross section from one end of the hole to the other.

A further object of this invention is to provide a drill having balanced curved cutting lips which engage tangentially at the periphery a characterized recess in each of the cutting lips intermediate the length thereof, whereby in operation heat generated during drilling is better dissipated and a burr-free hole to the full diameter of the drill will be formed. Other objects and advantages of the present invention will be made more apparent hereinafter.

BRIEF DESCRIPTION OF THE DRAWING

There is illustrated in the attached drawing a presently preferred embodiment of the present invention wherein:

FIG. 1 is an elevation view of a drill embodying principles of the present invention;

FIG. 2 is an elevation view of the drill of FIG. 1, rotated 90° from the showing of FIG. 1.

FIG. 3 is a plan view of the drill of FIG. 1;

FIG. 4 is a cross-sectional view of a plate illustrating the start of the hole formed by the novel drill; FIG. 5 is a cross-sectional view similar to FIG. 4 illustrating the hole formed in the plate midway through drilling thereof;

FIG. 6 is a cross-sectional view similar to FIG. 4 illustrating the hole formed as the tip of the drill penetrates the opposite side of the plate of material being drilled; and FIG. 7 is a cross-sectional view of a finished hole drilled in the plate.

DESCRIPTION OF THE PREFERRED EMBODIMENT OF THE INVENTION

Referring to FIGS. 1, 2 and 3, there is illustrated a drill 10 embodying the present invention. The drill 10 may include a fluted body 12 having two flutes 16 and 18. A shank portion (not shown) is provided on the body 12 to permit connection of the drill to a chuck.

The drill of the present invention is formed with a cutting point 20 made by gradually decreasing the included angle "A" normally provided on conventional twist drills so as to provide two cutting lips 22 and 24 which flow in a continuous compound curve from a pointed tip or cutting edge 26 and join tangentially with the drill diameter. This formation of the drill point is preferably like that disclosed and claimed in copending application, Ser. No. 714,393 filed Feb. 14, 1968, now U.S. Pat. No. 3,443,459, granted May 13, 1969.

The cutting point 20 of the present invention may therefore initially be formed by determining the included angle generally recommended and accepted as the most efficient cutting on conventional twist drills for that material and then grinding the cutting lips 22, 23 and 24, 25 in a continuous compound curve to tangentially engage and join both the periphery of the body and the line defined by the included angle of the straight cutting lips normally formed on conventional drills for most efficient drilling.

As set forth in said copending application Ser. No. 714,393, it is seen that the stress distribution on the cutting lips increases for some distance on the center or the axis of the drill and then decreases as the drill diameter is approached. The stress at the peripheral corner is substantially reduced and the stress is likewise substantially reduced at the drill tip 26. Stress is concentrated generally intermediate the length of the cutting lips where it can best be handled by the drill. "Heel dragging" is eliminated by providing progressive relief on the portion (35, 36) of the cutting face dynamically trailing the cutting lip (22, 24).

The improvement in the present invention results from forming a characterized recess in each cutting lip intermediate the length thereof to provide a discontinuous cutting lip. The recess in each cutting lip 22, 23 and 24, 25 includes a generally upright wall or surface 29, 30 and a generally transverse wall or surface 31, 32. As seen in FIG. 1, it is preferred that the walls 29 and 30 extend inwardly from the cutting lip and be relieved so as to converge toward one another axially toward the end of the body 12 remote from the cutting point to provide axial relief. Furthermore, the walls 31 and 32 of each recess in the cutting lip extend rearwardly from the cutting lips toward intersection with walls or surfaces 29, 30 and are relieved rearwardly from the cutting lip with respect to the direction of rotation. The cutting lips 22 and 24 must be balanced with respect to one another.

It has been unexpectedly found that a drill formed with cutting lips each having a characterized recess as in the present invention will penetrate material where desired without prepunching or center drilling a hole at the exact center of the larger hole to be drilled. The novel drill is capable of drilling both soft and hard materials and is self-centering so as to form a hole that is round and within very close tolerances from top to bottom of the hole. Furthermore, the drill of the present invention has been utilized to drill extremely hard metals, for example, stainless steel, which has been heretofore virtually impossible to drill, and to do so while obtaining the desired quality of hole. The holes are smooth, requiring no further reaming or boring in most instances.

Turning now to FIGS. 4, 5 and 6 there is illustrated the drill in use in penetrating a plate of material. The drill 10 is secured in a drill chuck and the chuck is lowered with the work properly positioned. The cutting edge 26 on point 20 of the drill 10 will penetrate the surface 40 of the workpiece 42 to form an initial small diameter hole indicated generally by the numeral 44. Stresses at this time are concentrated adjacent the cutting edge 26 of the drill and immediately adjacent the point 20 of the drill and the heat generated is moved downwardly through the material of workpiece 42 as indicated generally by the radiating lines below the drill point. There is actually a plastic condition of the material adjacent and below the point. After initial penetration by the drill point 20 through the surface 40, the surfaces of the cutting lips 22 and 24 will engage and cut into the surface 40 to extend the hole to the full desired diameter. The point 20 stabilizes the drill and prevents wobbling of the drill, which might cause bell mouthing at the entry end of the hole. As boring continues, the heat generated from the point 20 will move downwardly through the work 42 and the hole 46 in the workpiece will be continually formed to the desired diameter.

As the point 20 approaches the surface 48 of the workpiece 42, the heat will reach the surface 48 and be dissipated outwardly from the drill and as the tip 26 of the drill penetrates the surface 48 (FIG. 5), the small burr indicated generally by the numeral 50 will be formed on the surface 48 of workpiece 42. Continued thrust applied to the drill will cause the penetration of the entire cutting lip through the workpiece 42 to form a hole 46 to the entire diameter desired (FIG. 7) and the burr will be cut away as the portion of the cutting lip below the surfaces 31 and 32 of the drill penetrate the surface 48, with the result that a burr-free hole is formed. Furthermore, the hole is smooth throughout its length as a result of the curved configuration of the portions of the cutting lips remote from the point and the tangential joining of the said portions of the cutting lips to the periphery of the drill 10.

I have found that the novel drill provides a controlled release of thrust pressure at breakthrough, that is, as the point 20 penetrates the surface 48 of the plate 42. As seen in FIG. 5, at breakthrough, only a small portion of surface 48 is cut away and the shoulders of the drill defined by transverse surfaces 31 and 32 remain supported by the material of the plate 42 adjacent and below the shoulders. There is continued reaction against the thrust of the drill and no sudden breakthrough that might cause burr formation on surface 48. The portions 22 and 24 of the cutting lips then gradually work their way through the remaining material, without lurching and without burr formation.

The point 20 will stabilize the drill on initial penetration even in relatively soft materials (for example, metal such as copper and aluminum or plastic such as an acrylic) that exhibit a high degree of plasticity adjacent the chisel edge of the point. The point 20 will continue to stabilize the drill continuously during drilling. In one test using the drill of the present invention, 1 inch holes were drilled through one-half inch aluminum plate with a 1½-horsepower drill press. No guide bushings were used and the drill size was double the thickness of the material. The holes formed were perfectly round and the top of the hole measured less than 0.0003 inch oversize, the bottom of the hole was on size.

Additional tests in 1025 steel reveal that hole tolerances of less than 0.0006 inch were maintained in material 2 inches thick using a 1 3/64 (1.4844) inch diameter drill. Readings taken at the mouth of the hole, center and bottom were as follows: top, 1.4850 inch; center, 1.4845 inch; and bottom, 1.4844 inch. The tolerances were accomplished without the use of guide bushings for the drill.

It is recognized that step drills have been utilized in the art to form a pilot hole and then to drill the hole to a greater diameter. However, with step drills, an initial pilot hole was ordinarily formed or alternatively, the drilling surfaces were formed in accordance with conventional theories utilizing conical points and accordingly, resultant holes did not have the smooth walled, burr-free characteristics of holes formed by the present invention. Comparative tests have demonstrated the improved results of the novel drill obtained by virtue of the discontinuous cutting lips formed by the present invention. That is, in the present invention, the surfaces 23, 25 which define the periphery of the tip portion of the drill are continuations of the main cutting lip portions 22 and 24. Both the tip portion of the cutting lip and the outward portions of the cutting lip are formed at a single time in a grinding machine in order to produce a continuous surface and then the recess is provided in each cutting lip. The grinding machine to produce the desired drill point geometry is preferably of the type disclosed in the copending application, Ser. No. 705,393 filed Feb. 14, 1968. It is believed that this precise formation of cutting lip, coupled with the axial relief, provided by the walls 29, 30 and the relief surfaces provided behind the cutting lips by surfaces 31 and 32, produce the improved combination which functions to give highly improved results over prior known drill constructions.

It is not necessary that the tip be formed with a curvature corresponding to that of the curvature of the cutting lip surfaces 22 and 24. It is possible to obtain improved results in conventional conical drills by forming a recess therein intermediate the length and further improvement results over conventional constructions when the surfaces 23 and 25 are straight, rather than compound curved and corresponding to the curvature of the cutting lip portions 22 and 24. However, more beneficial results are obtained if the surfaces 22, 24 and 23, 25 are in fact continuous with the characterized recess being defined therein.

While I have shown a presently preferred embodiment of the present invention, it will be understood that other modifications may be made within the scope of the following claims.

I claim:

1. A drill for boring a smooth-walled burr-free hole comprising a body having discontinuous cutting lips formed at one end thereof, the cutting lips each extending generally from a tip substantially at the axis of rotation of the drill to the peripheral edge thereof, the cutting lips each being recessed intermediate the length thereof at a distance spaced from the tip, each recess being defined by a first surface extending inwardly from the cutting lip toward the axis of the drill to provide axial relief and a second surface extending rearwardly from the cutting lip with respect to the direction of rotation of the drill and intersecting the said first surface, the second surface being relieved rearwardly from the cutting lip, the portion of each cutting lip remote from the tip and on the opposite sides of the recess being formed along a curve extending to tangentially engage and join both the periphery of the drill body and a line defined by the included angle of the straight cutting lips normally formed on conventional drills for most efficient drilling, whereby in operation, heat generated during drilling is better dissipated and a burr-free hole to the desired diameter is formed.

2. A drill as in claim 1 wherein the second surfaces define shoulders which provide resistance to lurching as the point penetrates the material being drilled, whereby the material adjacent the point is cut away gradually to provide a burr-free hole.

3. A drill as in claim 1 wherein the entire length of each cutting lip is formed along a curve extending to tangentially engage and join both the periphery of the drill body and a line defined by the included angle of the straight cutting lips normally formed on conventional drills for most efficient drilling.

4. A drill as in claim 3 where the second surfaces are generally transverse to the longitudinal axis of the drill and define shoulders which provide resistance at breakthrough of the point, whereby the remaining material adjacent the point is cut away gradually to provide a burr-free hole.